US010313427B2

(12) United States Patent
Tatourian et al.

(10) Patent No.: US 10,313,427 B2
(45) Date of Patent: Jun. 4, 2019

(54) CONTEXTUAL APPLICATION MANAGEMENT

(71) Applicant: Intel Corporation, Santa Clara, CA (US)

(72) Inventors: Igor Tatourian, Santa Clara, CA (US); Rita H Wouhaybi, Portland, OR (US); Hong Li, El Dorado Hills, CA (US); Tobias M Kohlenberg, Portland, OR (US); Adam Jordan, El Cerrito, CA (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 14/495,274

(22) Filed: Sep. 24, 2014

(65) Prior Publication Data

US 2016/0085763 A1 Mar. 24, 2016

(51) Int. Cl.
*G06F 8/70* (2018.01)
*H04L 29/08* (2006.01)
*G06F 8/61* (2018.01)

(52) U.S. Cl.
CPC .............. *H04L 67/10* (2013.01); *G06F 8/62* (2013.01); *H04L 67/22* (2013.01)

(58) Field of Classification Search
CPC ..... G06F 8/61; G06F 8/62; G06F 8/70; G06F 8/71; G06F 11/30; G06F 11/3438
See application file for complete search history.

(56) References Cited

U.S. PATENT DOCUMENTS

| 8,489,676 B1* | 7/2013 | Chaplin ............ G06F 17/3089 709/201 |
| 8,866,701 B2* | 10/2014 | Momchilov .......... G06F 3/1454 345/1.1 |
| 9,020,992 B1* | 4/2015 | Gunda ............. G06F 17/30073 707/827 |
| 9,071,923 B2* | 6/2015 | Zhang .................. H04W 4/001 |

(Continued)

OTHER PUBLICATIONS

International Search Report and Written Opinion received for PCT Patent Application No. PCT/US2013/058023, dated Jun. 3, 2014, 5 pages.

*Primary Examiner* — Alvin H Tan
(74) *Attorney, Agent, or Firm* — Schwabe, Williamson & Wyatt, P.C.

(57) ABSTRACT

Technologies are presented that optimize application management on a computing device through contextual application archival and retrieval. A method of managing applications may include: learning contextual relevancy of one or more applications installed on a computing device to a user of the device and determining whether an application is no longer contextually relevant to the user. If the application is no longer contextually relevant, the device may send a request to an application management service to obtain and/or maintain the application; create a placeholder for the application at the device; and remove the application from the device. The device may monitor contextual inputs for relevancy of the archived application. If contextual relevancy is determined, the device may send a request to the service to provide the archived application or a replacement of the archived application to the device; receive the requested application; install the requested application; and remove the placeholder.

24 Claims, 6 Drawing Sheets

(56) References Cited

U.S. PATENT DOCUMENTS

| | | | |
|---|---|---|---|
| 9,311,121 B2* | 4/2016 | Deshpande | G06F 9/45533 |
| 9,367,403 B2* | 6/2016 | Hou | G06F 9/445 |
| 9,442,709 B1* | 9/2016 | Delker | G06F 8/61 |
| 9,549,286 B2* | 1/2017 | Birch | H04W 8/04 |
| 2004/0117441 A1 | 6/2004 | Liu et al. | |
| 2004/0158659 A1 | 8/2004 | Yamamoto | |
| 2008/0091613 A1 | 4/2008 | Gates et al. | |
| 2012/0290916 A1 | 11/2012 | Parekh et al. | |
| 2013/0173556 A1* | 7/2013 | Grigg | H04L 67/04 707/667 |
| 2013/0227236 A1 | 8/2013 | Flynn et al. | |
| 2013/0232229 A1* | 9/2013 | Firman | G06F 8/61 709/219 |
| 2016/0019224 A1* | 1/2016 | Ahn | G06F 17/30073 707/671 |
| 2017/0046173 A1* | 2/2017 | Moraes | G06F 13/38 |

* cited by examiner

CONTEXTUAL APPLICATION MANAGEMENT

TECHNICAL FIELD

The technologies described herein generally relate to application management in a computing system.

BACKGROUND

Currently, the number of applications available to users for use on their computing devices is countless. Many applications and files (e.g., data files, video, images, libraries, etc.) are of significant sizes that may take up a large percentage of disk space on the devices, and available memory may not be able to keep up with the demands of applications. These issues are especially prevalent with smaller computing devices (e.g., mobile devices such as smart phones or tablets) that may have even less disk space and/or memory. Furthermore, users tend to install and/or use applications and files based on current contextual need. For example, on a business trip to a large city, a user may install a few local applications for public transportation, traffic, restaurants, sightseeing, etc. In addition, the user may install an application that was developed for a particular conference the user is attending there. Upon returning home, the user may no longer have a contextual need for those applications, but may forget to remove them, leaving them to occupy precious system resources and clutter a user interface of a computing device. No known solutions provide optimized application management and archival based on contextual relevancy and user behavior.

BRIEF DESCRIPTION OF THE DRAWINGS/FIGURES

Figure 1:
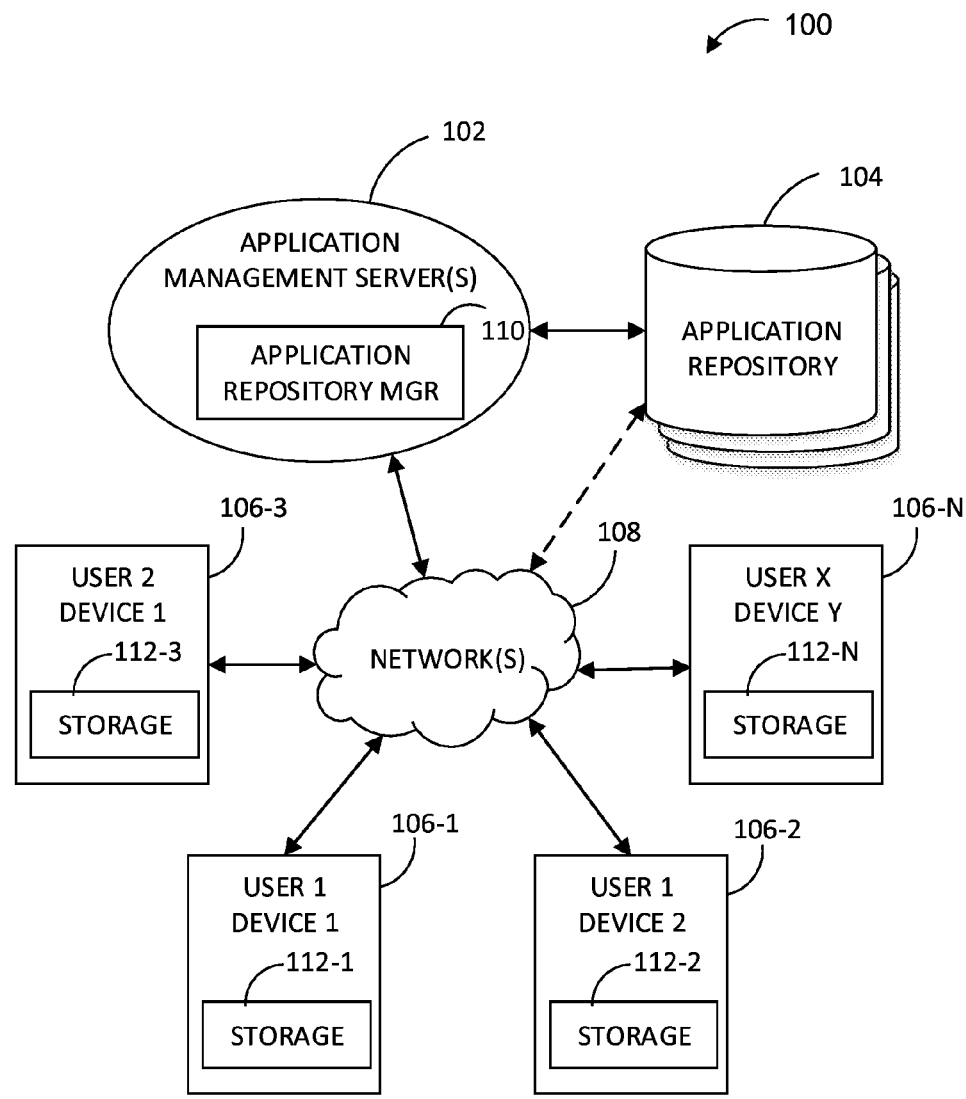
FIG. 1 is a block diagram of an example system described herein, according to an embodiment.

In the drawings, the leftmost digit(s) of a reference number may identify the drawing in which the reference number first appears.

DETAILED DESCRIPTION

In the embodiments presented herein, a cloud-based service that can optimize application storage and usage based on contextual relevancy is described. Using this service, applications on a user device that are not contextually relevant to a user based on sensed data about the user, their previous behavior, and their environment are determined and moved elsewhere to secondary storage external to the user device, freeing space on the user device, leaving necessary configuration settings and metadata to be used to easily restore the application in the future. In addition, by leveraging contextual information about future needs, the service may move applications back onto the device when it determines that the user will need the application in the near future. Although the focus of the example embodiments used herein involve management of applications and associated files, the technologies described herein can also be applied in a similar manner to manage other types of files (e.g., data files, videos, images, libraries, etc.), as would be understood by a person of ordinary skill in the relevant art.

Embodiments are now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the concepts described herein may also be employed in a variety of other systems and applications other than what is described herein.

FIG. 1 is a block diagram of an example system 100, according to an embodiment. System 100 may include an application management server 102, of an application management service, for example, and an application repository 104 in which applications of participating users/user devices may be stored. Application management server 102 may include, or have access to, one or more data stores (not shown) of application-specific information, and optionally, user preference information. System 100 may also include one or more user devices 106-1 to 106-N (collectively, 106) of users of the application management service. The application management server 102, the application repository 104, and the user devices 106 may be in communication via one or more networks, such as one or more network(s) 108.

The application management server 102 may include an application repository manager 110 that may be implemented in software and/or hardware executed or controlled by a controller or processor of the application management server 102. While only one application management server is illustrated for clarity and ease of discussion, it should be appreciated that the application management server may include multiple distributed server computers for redundancy and/or load sharing, for example.

The user devices 106 may be computing devices that may include mobile and/or non-mobile devices. Mobile devices may include, but are not to be limited to, for example, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, etc. Non-mobile devices may include, but are not to be limited to, for example, personal computers (PCs), televisions, smart televisions, data communication devices, media playing devices, gaming consoles, etc. User devices 106 may include controllers (or processors) and other components that execute software and/or control hardware to execute local programs or consume services provided by external service providers over a network. For example, user devices 106 may include one or more software clients or applications that run locally and/or utilize or access web-based services (e.g., online stores or services, social networking services, etc.). User devices 106 may also, or instead, include a web interface running in a browser from which the user device can access such web-based services. User devices 106 may also include storage devices 112-1 to 112-N (collectively, 112) to store logic and data associated with the programs and services used by the users of the user devices.

As implementation of the application management system may be cloud-based, in embodiments, the application management system may be implemented similar to a peer-to-peer system where the application management server 102 may also be a user device 106. In embodiments, application management server 102 may be the user device 106 for which applications are being managed, or may be another user device 106. In other embodiments, application management server 102 may be a dedicated server.

Network(s) 108 may include any wired or wireless network, such as a Wide Area Network (WAN), a Local Area Network (LAN), and/or the like. As an example, network(s) 108 may be a distributed public network, such as the Internet, where application management server 102 and user devices 106 are connected to the network(s) 108 via wired or wireless connections.

Application repository 104 may be located within application management server(s) 102 or external to application management server 102 (as in the embodiment shown in FIG. 1). Application management server 102 may have direct access to application repository 104, or may access application repository 104 indirectly via one or more networks such as network(s) 108. In embodiments, application repository 104 may include a single storage device or multiple storage devices. In an embodiment, application repository 104 may include multiple storage devices distributed over one or more networks.

In embodiments described more fully below, the application management service may determine what applications may no longer be contextually relevant to a user and store those applications in application repository 104, removing the applications from their respective user devices to free up space and resources. Copies of the applications to be stored may be obtained from the respective user devices or, alternatively, from an external source (e.g., vendor websites, application databases, etc.) One or more of the applications to be stored may not be the latest version. Thus, for each application to be stored, application management server 102 may obtain and maintain the latest version of the application in addition to, or instead of, the earlier application version. In an embodiment, whether to obtain/maintain the latest application version may depend on obtained user preferences and/or the application license for the respective user. To obtain/maintain later versions of applications, application management server 102 may request the later versions from one or more external sources (e.g., vendor websites, application databases, etc.) (not shown in FIG. 1) over a network.

A user of a device may become a user of the application management service by registering for the service through, for example, client software that is downloaded and run on a user device 106 or a web-based client running in a browser on a user device 106. When a user registers, aside from potentially providing identification and contact information, a user may be asked to establish one or more user profiles and/or user preferences. For example, a user may be asked to provide, or allow the service to collect, application-specific information and/or preferences for one or more applications on the user device (e.g., user identification and/or password information, user-specific data that exists for use with an application, preferred modes of use, licensing information, etc.). As another example, a user may be asked to provide, or allow the service to collect, application archival and/or retrieval preferences (e.g., whether to obtain/maintain the latest version of an application or an earlier version, whether to store personal user data along with respective applications, preferences with regard to streaming, installing, and/or executing an application, what to monitor for contextual relevancy, etc.). As a further example, a user may be asked to provide, or allow the service to collect, application usage history data that may be used to determine contextual relevancy, how best to stream an application back to a user device, how best to re-install an application, how best to execute a re-installed application, etc. The user registration and/or profile information/preferences may be stored at the user device 106, at the application management server 102, or both. Storage of user profile and/or preference information at the application management server may depend on whether the user authorized such external storage of information personal to the user. In an embodiment, personal information provided to the application management server may be encrypted. Further questions may also be asked depending on the user's answers to previous questions. In an embodiment, a user may opt to use recommended settings and/or a recommended profile (e.g., default settings and/or profile) instead of having to answer questions to create one. A default profile may, for example, be based on crowd-sourced information and/or preferences of other users of the application management service. In an alternative embodiment, a user may choose not have one or more user profiles created. In embodiments, a user's profile and/or preferences may be edited by the user and/or may be automatically updated based on automatically collected information regarding the user's application usage and associated contextual events.

Figure 2:
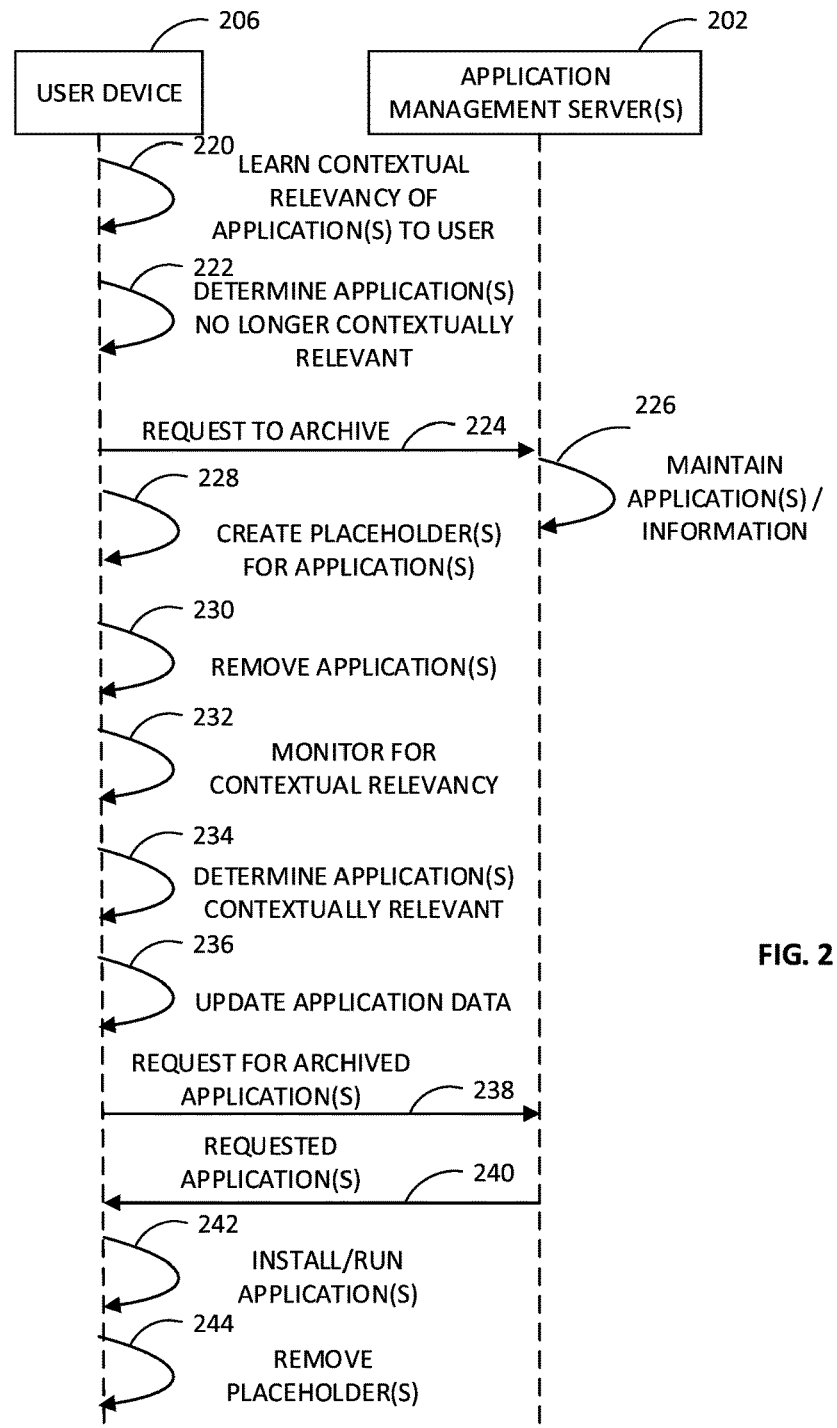
FIGS. 2 and 3 are sequence diagrams of example process flows as described herein, according to embodiments.

Usage of the application management service will now be discussed with reference to an example embodiment depicted in the diagram of FIG. 2.

An application management application that is loaded and running on a user device 206 may learn contextual relevancy (220) of other applications that are available to the user on the user device. Contextual relevancy of an application may be based on various contextual factors or events, including but not to be limited to: a determined location of user device 206 while the application is installed and/or used (e.g., as determined by a global positioning system (GPS) of the user device), when and what circumstances existed when the user initially installed the application, keywords used to find the application, keywords associated with the application in its description in an application market, a calendar date that the application is used, a time of day that the application is used, an event or time frame during or at which the application is used (e.g., a sporting event, a concert, a conference, a season, a holiday duration, etc.), other applications used before or after the application is used, proximity to establishments while the application is used (e.g., as determined using GPS coordinates of the user device and known locations of an establishment), proximity to another person while the particular application is used (e.g., as determined using GPS coordinates of the user device and a user device of the other person, using a person finder application (based on a social relationship, for example), etc.), usage history of the application, on what computing device the particular application is being used (e.g., if the user has more than one user device), a work status of the user while the application is being used (e.g., whether the user appears to be working or not, based on, for example, the location of the user, the day and/or time, the applications the user is using, the login used for one or more applications used by the user, etc.). Contextual relevancy of an application may also be based on the elapsed time since the application was last used. In addition, contextual relevancy may be based on an explicit request from the user to archive an application (e.g., an application that the user does not expect to use for a while but does not want to permanently remove). Other factors or events to establish contextual relevancy of an application may also be contemplated. The learned relationships of the factors or events to usage of applications on the user device may be stored as application relevancy data on the user device and/or at the application management server 202.

In an embodiment, part of the learning process may include scanning user device 206 for any executables and libraries (or any application-related files) on the device. User device 206 may collect and maintain knowledge of the executing processes, which may allow the device to learn which applications the user runs, how frequently they are run, when they are run, etc. With this knowledge, user device 206 may determine one or more applications that are no longer contextually relevant to the user (222). The determination of whether an application is no longer contextually relevant to the user may be based on, but is not to be limited to, any one or more of: a determined location of user device 206, calendar date, time of day, an event date range, proximity to establishments, proximity to other users (or user devices), usage history of the application, usage history of other applications, what computing device is being used, work status of the user, elapsed time since the application was last used, an explicit request from the user to archive the application, what other users of the application management service (e.g., crowd-sourced users, other users in proximity of the user, other users with a trusted social media relationship with the user, etc.) with similar context have chosen for application archival (e.g., based on explicit requests to archive, requests to archive based on machine learning, etc.), etc. For example, if it is determined by user device 206 that an application has never been used, or has not been used within a set period of time (e.g., within the last 30 days), user device 206 may determine that the application is not currently contextually relevant to the user. In another example, user device 206 may have learned that a destination travel application about New York City is only used by the user when the user (or user device 206) is within a certain number of miles of New York City. If it is determined by user device 206 that user device 206 is not, or is no longer, within that vicinity of New York City, user device 206 may determine that the New York City travel application is no longer contextually relevant to the user. In yet another example, user device 206 may have learned that a U.S. Open Tennis Tournament application has only been used in the months of August and September. If it is determined by user device 206 that it is October, user device 206 may determine that the U.S. Open application is no longer contextually relevant to the user. In a further example, a user of user device 206 may explicitly request (e.g., via a user interface of user device 206) that a particular application be archived, which may indicate to user device 206 that the particular application is not currently relevant to the user.

User device 206 may send a request to application management server 202 to archive one or more applications (224) that have been determined to not currently be contextually relevant to the user. According to embodiments, for each application to be archived, the request may include, but is not to be limited to, any one or more of the following: an identifier of the application to be archived, a copy of the application (e.g., application bits or files such as .exe files, .dll files, .cab files etc.), an identifier of the user, an identifier of the user device, application preferences/settings of the user, archival/retrieval preferences of the user, application usage history of the user, instructions related to what version of the application to archive (e.g., the currently installed version, the latest version, etc.), instructions related to how to store the application, instructions related to how to stream the application back to the user device if requested, etc. In an embodiment, the providing of user identification, profile, preference, and/or application usage history information to the application management server 202 may depend on whether the user authorized transfer of such information (e.g., via user preferences) that may be personal to the user. In an embodiment, personal information provided to the application management server may be encrypted. If such user-specific information is made available to application management server 202, application management server 202 may use this information to more efficiently store the application and/or stream the application back to user device 206 when requested.

Application management server 202 may receive the request to archive the application(s) and, based on the request, may maintain the application(s) as archived application(s) (226). In an embodiment, application management server 202 may receive or obtain a copy of an application from user device 206. In an alternative embodiment, application management server 202 may obtain a copy of the application from an external source (e.g., a vendor's website, an application database, etc.). Application management server 202 may store the obtained copy of the application in an application repository accessible by the application management server 202 (e.g., within application management server 202, or accessible by application management server 202 via a network or direct communication). In an embodiment, application management server 202 may store information on where to obtain the application if requested instead of storing an actual copy of the application. In an embodiment, application management server 202 may obtain and/or maintain the most recent version of the application. Alternatively, application management server 202 may obtain and/or maintain an earlier version of the application (e.g., the version that was on user device 206, or another version). What application and/or version is obtained/maintained may depend on user preferences, user licenses, etc. In an embodiment, if an application is already being maintained by application management server 202, a duplicate copy of the application need not be obtained/maintained (e.g., a single copy of an application may be stored/maintained for multiple users).

"Archival" may not necessarily refer to the archival, or storing, of an actual application. In an embodiment, an interest placeholder for an application, rather than an actual application, may be maintained by user device 206 and/or application management server 202, based on learned context from usage of user device 206, for example. In an embodiment, a request to maintain an interest placeholder may be sent by user device 206 to application management server 202. The interest placeholder may be defined via user preferences or instructions provided in the request that are based on user-specified interests or learned interests from contextual actions by the user. For example, a user may indicate (e.g., in user preferences or through learned contextual actions) that he or she is interested in the latest version of an application (e.g., for one or more specific applications, or even all applications), even if the user's current version is not the latest version. In this case, application management server 202 may maintain information regarding this interest in the latest application instead of a copy of the application itself. When the application needs to be retrieved, the application management server 202 may obtain the latest version of the application (e.g., from local or external stores). In another example, a user may indicate (e.g., in user preferences, via learned contextual actions, etc.) that he or she is interested in one or more types of applications (e.g., types of game applications, productivity applications (e.g., office-related), interest applications (e.g., cooking, travel, etc.), etc.) that match certain criteria (e.g., having the highest user rating). In this case, application management server 202 may maintain information regarding these specific interests instead of maintaining specified applications. When there is contextual need (e.g., as requested from user device 206) related to these maintained interests, the application management server 202 may suggest and/or provide to user device 206 application(s) that meet the user's criteria. As an example, if user device 206 learns that the user is interested in Sudoku games, tends to play games on weekends, and prefers games that have a high user rating, user device 206 may send a request to application management server 202 to "archive" this interest information such that when circumstances are contextually right, a highly rated Sudoku game can be quickly and efficiently provided to user device 206.

Records of the archived applications and/or interest information may be maintained by application management server 202 (e.g., in secondary storage of application management server 202 or in an application repository (e.g., application repository 104 of FIG. 1)) and may include, but are not to be limited to, application identifiers, application version information, information related to application archival requests for the applications (e.g., user identifier information, user device information, timestamp information, user profile and/or preference information, etc.), information related to application retrieval requests for the applications (e.g., user identifier information, user device information, timestamp information, user profile and/or preference information, etc.), etc. These records may serve as a directory and/or history of what is, and was, being maintained by application management server 202.

User device 206 may create a placeholder, or stub, for an archived application at user device 206 (228). The placeholder may include, but is not to be limited to, metadata related to the application (e.g., an identifier of the application, version information, user information, application-specific user preferences, settings, and/or data, etc.), configuration settings, instructions for re-installing the application, etc. The placeholder may also include a visual representation of the archived application for presentation on a display of a user interface of user device 206. For example, the visual representation may look similar to an icon used to identify the application to the user, but may be grayed out or have another type of indication that the application is currently archived. The archived application (i.e., any unnecessary bits or files not otherwise kept by the placeholder) may be removed from user device 206 (230).

User device 206 may monitor for contextual relevancy of archived applications (and/or archived interest information) (232) and determine that one or more applications (or interests) may once again be contextually relevant (234). The monitoring includes monitoring for contextual relevancy indicators such as, but not limited to, location of the user device, usage of one or more applications on the user device, calendar date, time of day, event date range, proximity to establishments, proximity to other users, what computing device is being used, work status of the user, explicit requests for applications by the user, etc.

In an embodiment, to determine contextual relevancy of archived applications or interests, user device 206 may perform a regular context check (e.g., daily, weekly, etc.) of current or recent context and learned relationships between various contexts and user actions or events. Referring back to a previous example, during a daily context check, it may be determined by user device 206 that it is August $1^{st}$. According to its record of learned contextual relationships (e.g., previously stored application relevancy data), user device 206 has knowledge that the U.S. Open Tennis Tournament application is used by the user in August and September. Based on this knowledge, user device 206 may determine that the archived U.S. Open Tennis Tournament application is once again contextually relevant. In an embodiment, context checks may be triggered, for example, by a user action, event, status change, etc. For example, a user action that may trigger a context check may be a change in location of user device 206. Referring back to a previous example, user device 206 may determine that user device 206 is within a specified number of miles from New York City. According to its record of learned contextual relationships, user device 206 has knowledge that the travel application is used by the user when the user is in New York City. Based on this knowledge, user device 206 may determine that the archived travel application is once again contextually relevant. An example event that may trigger a context check may include a determination that a familiar user device is nearby user device 206. For example, user device 206 may determine that a user device of the user's friend Joe is nearby. According to its record of learned contextual relationships, user device 206 has knowledge that the user often plays an online game with his friend Joe (e.g., when Joe's user device is nearby). Based on this knowledge, user device 206 may determine that the archived game is now contextually relevant. In another example, a change in status that may trigger a context check may be the logging in of a user into his or her work account after, for example, a two-week vacation. Applications related to work may have been archived after a certain period of non-use (e.g., a week). According to its record of learned contextual relationships, user device 206 has knowledge that the user uses certain work-related applications when the user is logged into his or her work account. Based on this knowledge, user device 206 may determine that the archived work applications are once again contextually relevant. In an embodiment, the determination of contextual relevancy may be based on an explicit request by the user for a particular archived application. For example, the user may double-click on a grayed-out placeholder icon that represents an archived application on the user interface of user device 206, indicating that the user would like to launch the archived application.

The monitoring for, and determining of, contextual relevance of archived applications may provide further "learned" knowledge with regard to contextual relevancy that may be used to update stored application relevancy data (236), according to an embodiment. Any apparent relationship between actions, events, status changes, timing, etc., of the user to application usage may indicate a contextual relevancy relationship that may be stored as application relevancy data for future relevancy assessment. As an example, it may be of particular importance to "learn" context surrounding explicit requests to use any application, including an archived application.

When it is determined that an archived application (or interest) is once again contextually relevant, user device 206 may request the archived application (or an application based on a contextually relevant archived interest) from application management server 202 (238). In an embodiment, user device 206 will automatically request the application from application management server 202 (e.g., in order to make the application available to the user as soon as possible). In another embodiment, user device 206 will ask the user for confirmation, via the user interface, for the application to be requested. In an embodiment, whether user device 206 automatically requests an application or waits for confirmation may depend on established user preferences.

In embodiments, a request by user device 206 to retrieve an application from application management server 202 may include, but is not to be limited to, any one or more of the following: an identifier of the application to be retrieved, an identifier of the user, an identifier of the user device, application preferences/settings of the user, archival/retrieval preferences of the user, application usage history of the user, instructions related to what version of the application to retrieve, instructions related to how to stream the application back to the user device, etc. In an embodiment, the providing of user identification, profile, preference, and/or application usage history information to the application management server 202 may depend on whether the user authorized transfer of such information (e.g., via user preferences) that may be personal to the user. In an embodiment, personal information provided to the application management server may be encrypted. If such user-specific information is made available to application management server 202, application management server 202 may use this information to more efficiently stream the application to user device 206.

Application management server 202 may receive the request for an application and may provide the requested application to user device 206 (240). In an embodiment, the requested application may be retrieved from an application repository or database (e.g., application repository 104 from FIG. 1) and streamed to user device 206 from application management server 202. As the application management server 202 may maintain multiple versions of the requested application, the appropriate version of the application may be retrieved based on provided preferences or instructions in the request. In an embodiment, the application to be retrieved may not be a version of the original application at all, but instead may be an entirely different application based on provided preferences or instructions in the request (e.g., a similar application with improvements over the original application or that comes more highly recommended). In an embodiment, if no specific preference/instruction is provided, application management server 202 may select a default application version to provide (e.g., the latest version, the version last loaded on user device 206, etc.).

In an embodiment, how the requested application is provided to user device 206 from application management server 202 may be based on information provided in the request for the archived application (to provide optimal streaming, for example). In an embodiment, based on application preferences of the user and/or a user's usage history of the application, it may be determined (e.g., using predictive analytics) what bits are needed first in order to receive/install first what the user is likely to initially run. For example, if a user usually bypasses introduction or instructional screens, then it may not be necessary to provide them. In other words, if a user usually uses only certain modules of an application, modules that do not usually get used may be provided last. In an embodiment, how the requested application is provided to user device 206 may depend on what is optimal for the type of user device it is (e.g., an older slower desktop computer, a newer faster laptop or mobile device, etc.). In an alternative embodiment (e.g., if no application preferences or usage history are available to the application management server 202), the requested application may be provided to user device 206 based on historical usage of the requested application by a plurality of crowd-sourced users of the requested application. In an embodiment, the requested application may be provided to user device 206 in an unmodified way.

In embodiments, measures may be taken to ensure that when an application is needed it is streamed, loaded, and executed with minimal delay (preferably no noticeable delay). In order to speed up application streaming and start-up at a user device, machine learning algorithms may be used to predict the user's intents as discussed above (based on, for example, location of the user device, date, season, etc.). In addition, based on the machine learning, binary files may be recompiled, and/or bits may be rearranged, in the cloud (e.g., at the application management server) as needed for an optimized order of execution. This may be similar to how L-caches and CPU branch predictors work where code is preloaded from memory and rearranged, and then the execution is guessed. In this way, a relatively small amount of code necessary to launch an application and execute menus and/or commands the user would normally use (e.g., as determined by the machine learning) may be streamed, while in the background, additional code chunks may be streamed to ensure that the user will have access to the data and functionality those code chunks provide as the application (e.g., a large game, large productivity application (such as an image editing application), etc.) runs deeper into its workflow. This pre-arranging of the streaming may minimize, if not alleviate, any noticeable delay in use of the application by the user. In an embodiment, compression may be used to stream data bits to a user device. Using compression may achieve better scalability and power efficiency and may optimize transfer rates and signal bandwidth. In an embodiment, the data bits may be encrypted.

User device 206 may receive the requested application from application management server 202 and install (and optionally run (e.g., if the application was explicitly requested by the user)) the application (242) based on settings and information saved in the placeholder for that application. In an embodiment, if the bits of the requested application are received in a modified order from application management server 202, the application may be installed in a modified order for optimal installation and use in accordance with the user's preferences and/or usage history. Even if the bits of the requested application are not received in a modified order, in an embodiment, user device 206 may optimally install (and optionally run) the application based on the user's preferences and/or usage history as may have been saved in the placeholder for the application. For example, if the user usually runs the application starting from a specific point in the application (e.g., a specific module, screen, game level, etc.), the application may be installed and run such that that specific point is what is first presented to the user.

Once the requested application is installed, the placeholder for that application may be removed (244). For example, in an embodiment, application or user specific information (e.g., preferences, settings, etc.) that was stored by the placeholder may be returned or copied to the application files that are to contain that information for use by the application. In an embodiment, an altered visual representation (e.g., icon) for the application may be replaced by what is normally the visual representation for that application. For example, a grayed-out icon that represented the placeholder for an archived application may be replaced by a full-color icon once the application is retrieved and re-installed.

Figure 3:
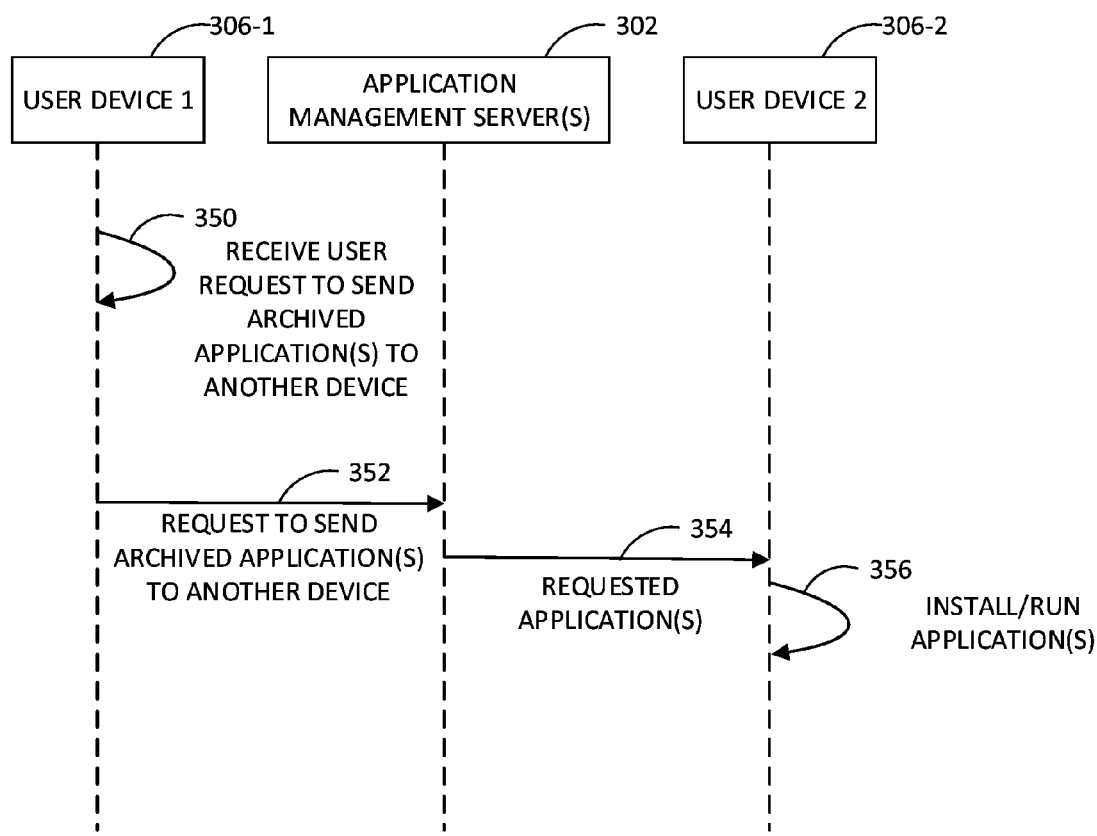

In an embodiment, a user may request (e.g., via a user interface on user device 206 or another device) that an archived application be retrieved and sent to a device other than user device 206. In this embodiment, the user's profile information may include information on other devices of the user, and a user may select to which device an archived application is to be sent. FIG. 3 illustrates this feature, according to an embodiment. In FIG. 3, user device 306-1 may receive a request from a user (e.g., via a user interface of user device 306-1) to have one or more archived applications sent to another user device 306-2 (350). User device 306-1 may send a request to application management server 302 to send the one or more archived applications to the other device 306-2 (352). In embodiments, a request by user device 306-1 to have an archived application retrieved and sent from application management server 302 may include, but is not to be limited to, any one or more of the following: an identifier of the application to be retrieved, an identifier of the user, an identifier of the user device to which the application is to be sent, application preferences/settings of the user, archival/retrieval preferences of the user, application usage history of the user, instructions related to what version of the application to retrieve, instructions related to how to stream the application to user device 306-2, etc. In an embodiment, the providing of user identification, profile, preference, and/or application usage history information to the application management server 302 may depend on whether the user authorized transfer of such information (e.g., via user preferences) that may be personal to the user. In an embodiment, personal information provided to the application management server may be encrypted. If such user-specific information is made available to application management server 302, application management server 302 may use this information to more efficiently stream the application to user device 306-2. Application management server 302 may need to retrieve a version of the archived application that is appropriate for user device 306-2 (e.g., if user device 306-2 is a different type of device than user device 306-1). If application management server 302 does not have immediate access to the required version of the archived application, then application management server 302 may need to obtain the required version from an external source prior to sending the application to user device 306-2. Once retrieved/obtained, application management server 302 may send the requested application to user device 306-2 (354). In an embodiment, the sending of an archived application to another user device may be controlled by a user license for that application and/or user. The application may be installed/run on user device 306-2 (356). In an embodiment, the installation (and optionally, the execution) of the application may be automatic (e.g., under direction of an application management application running on user device 306-2). In an alternative embodiment, the installation and execution of the application at user device 306-2 may be under the direction of the user of user device 306-2.

In an embodiment, user profile information, preferences, and/or application usage history, as well as learned application relevancy data, may be migrated to other devices of the user as application management setting information, which may be useful if the user is changing devices or wishes to use the application management service with other devices of his or hers. In another embodiment, this application management setting information may be migrated to a device of another user. Since it takes time for the application management service to learn patterns and relationships with regard to application usage, this "bootstrapping" of another's information may provide a better starting point for another user than starting the learning process from scratch. In embodiments, providing the application management setting information to another user device of the user, or to a user device of another user, may be accomplished by, but not limited to, one or more of providing a user identifier for the user (e.g. to obtain this information from the application management server, if stored there, optionally with permission from the user), performing a near-proximity data exchange between user devices (e.g., a "bump" data exchange between two devices), providing an identification of the user through a trusted social media relationship, directly copying one or more setting files from one user device to another user device, etc.

The technology described herein is referred to as "cloud"-based, as data (i.e., applications and/or information) are temporarily moved to networked secondary storage. This secondary storage may be located, for example, anywhere from remotely at a datacenter to locally on a home or office gateway. As would be understood by those of ordinary skill in the relevant art, being "cloud"-based may include several scenarios. For example, when an application is available for immediate use, the application may be considered "online" (e.g., on a hard drive of a user device). If an archived application is stored on LAN-speed available storage (e.g., in a home or office), it may be considered "nearline," since it may be quickly provided to a user device. If an archived application is stored non-locally (e.g., on a WAN), it may be considered "offline," as it may take longer to retrieve, re-load, and start up.

In an embodiment, it may be determined by the user device and/or the application management server that a user has multiple user devices, wearable devices, etc., and that one or more of those devices are local to the user or user device (e.g., in communication via a wired or wireless LAN) and have extra disk space, processing power, etc. This determination may be made using device information from, for example, explicit instructions or information provided in an archive request from a user device, a user profile, etc. The application management service may use one or more of the other user devices to locally cache, or store, at least a portion of an application file and/or data (e.g., based on a machine learning allocation algorithm) in order to reduce latency that there would otherwise be if having to archive and retrieve the file(s) elsewhere further out in the cloud. In other words, distributed caches on local devices may be assessed for archival before having to go further out into the cloud. As an example, in FIG. 1, User 1 has user devices Device 1 (106-1) and Device 2 (106-2) that may be in local communication via a wired or wireless LAN. If it is determined that an application or file on Device 1 is no longer contextually relevant, the application management server may first determine whether there is sufficient space to archive the application or file (or at least a portion of the application or file) locally on Device 2 rather than in a repository elsewhere in the cloud. In addition to reduced latency, an advantage of this feature may include allowing easier application and/or data sharing amongst family and friends.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

Figure 4:
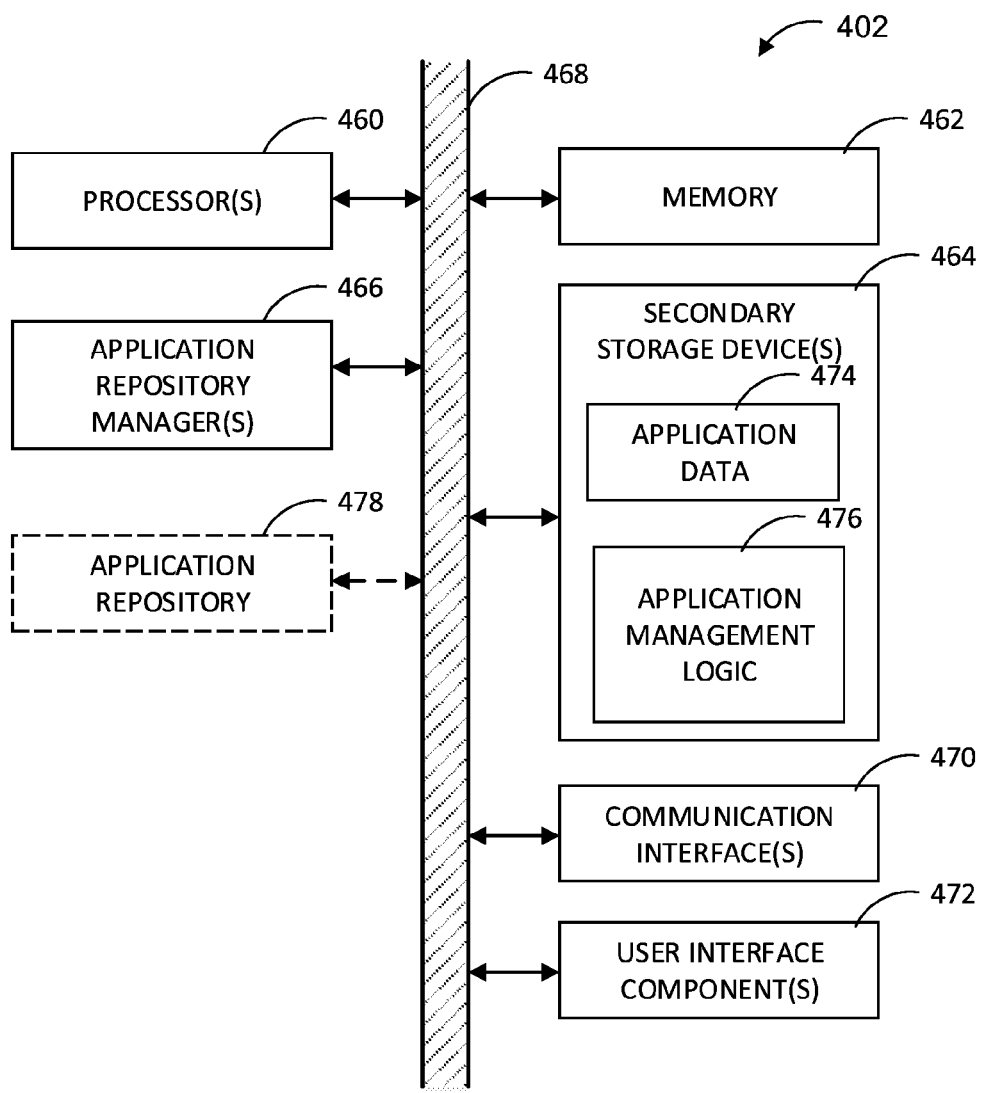
FIG. 4 is a block diagram of an example application management server, according to an embodiment.
Figure 5:
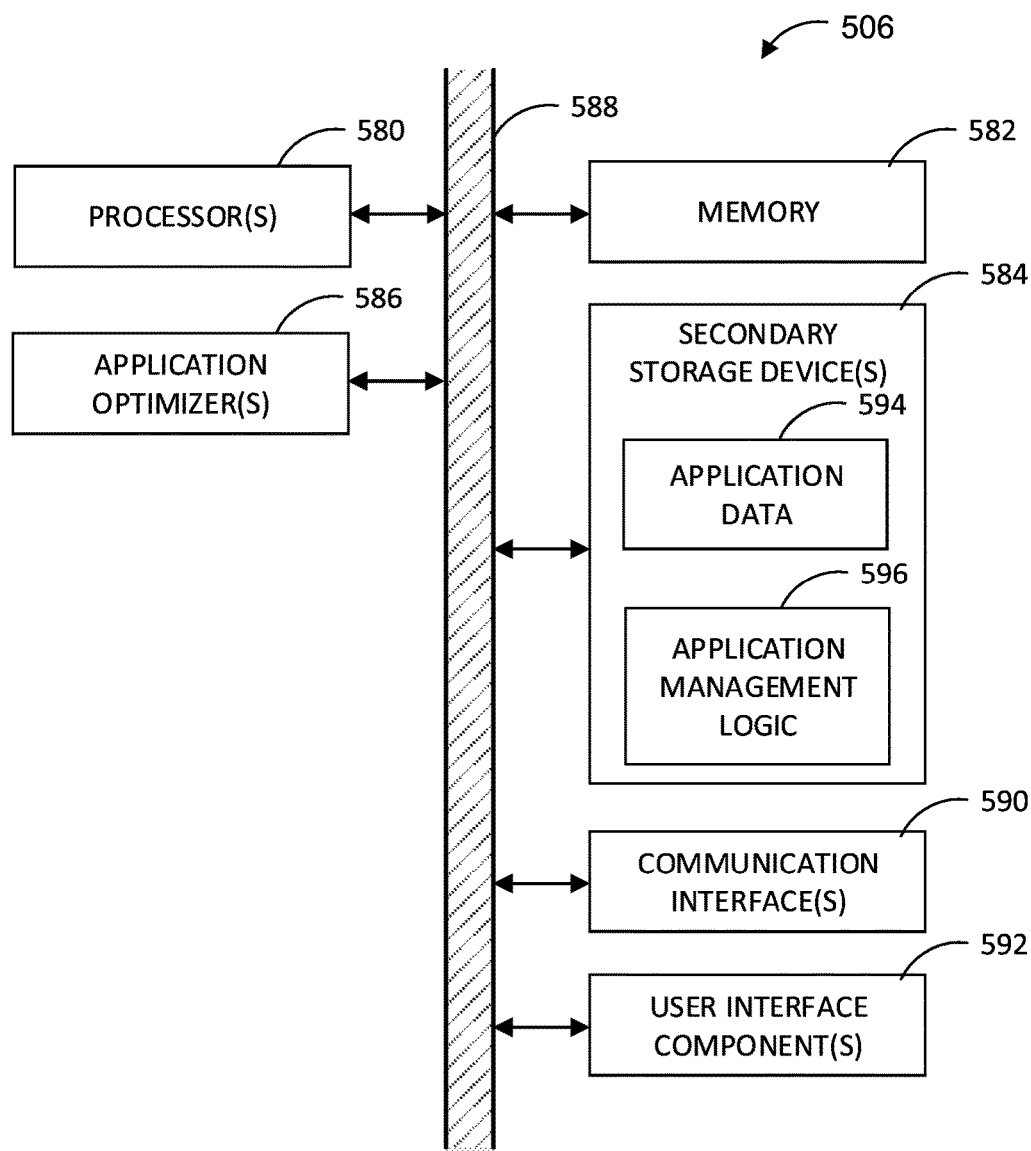
FIG. 5 is a block diagram of an example user device, according to an embodiment.

As stated above, in embodiments, some or all of the processing described herein may be implemented as hardware, software, and/or firmware. Such embodiments may be illustrated in the context of example computing systems 402 and 506 as shown in FIGS. 4 and 5. Computing system 402 shows an implementation of application management server 102/202/302 according to an embodiment, and computing system 506 shows an implementation of a user device 106/206/306, according to an embodiment.

Computing system 402 may include one or more central processing unit(s) (CPU), such as one or more general processors 460, connected to memory 462, one or more secondary storage devices 464, and one or more application repository manager(s) 466 by a link 468 or similar mechanism. In an embodiment, application repository manager(s) 466 may be processors dedicated to application management by server(s) of an application management service as described herein. In an embodiment, application repository manager(s) 466 may be integrated with general processor(s) 460 (e.g., a processor core). The general processor(s) 460 and/or application repository manager(s) 466 may include one or more logic units for carrying out the methods described herein. In embodiments, other logic units may also be present. One of ordinary skill in the art would recognize that the functions of the logic units may be executed by a single logic unit, or any number of logic units. Computing system 402 may optionally include communication interface(s) 470 and/or user interface components 472. The communication interface(s) 470 may be implemented in hardware or a combination of hardware and software, and may provide a wired or wireless network interface to a network, such as network 108 in FIG. 1. The user interface components 472 may include, for example, a touchscreen, a display, one or more user input components (e.g., a keyboard, a mouse, etc.), a speaker, or the like, or any combination thereof. The one or more secondary storage devices 464 may be, for example, one or more hard drives or the like, and may store data 474 (e.g., application data) and logic 476 (e.g., application management logic) to be executed by one or more application repository manager(s) 466 and/or general processor(s) 460. In an embodiment, general processor(s) 460 and/or application repository manager(s) 466 may be microprocessors, and logic 476 may be stored or loaded into memory 462 for execution by general processor(s) 460 and/or application repository manager(s) 466 to provide the functions described herein. Computing system 402 may optionally locally include application repository 478 for storing applications, associated files, information regarding archived applications/files, etc., which may be instead of, or in addition to, an external application repository (such as application repository 104 of FIG. 1). Note that while not shown, computing system 402 may include additional components.

Computing system 506 may include one or more central processing unit(s) (CPU), such as one or more general processors 580, connected to memory 582, one or more secondary storage devices 584, and one or more application optimizer(s) 586 by a link 588 or similar mechanism. In an embodiment, application optimizer(s) 586 may be processors dedicated to application management by user devices as described herein. In an embodiment, application optimizer(s) 586 may be integrated with general processor(s) 580 (e.g., a processor core). The general processor(s) 580 and/or application optimizer(s) 586 may include one or more logic units for carrying out the methods described herein. In embodiments, other logic units may also be present. One of ordinary skill in the art would recognize that the functions of the logic units may be executed by a single logic unit, or any number of logic units. Computing system 506 may optionally include communication interface(s) 590 and/or user interface components 592. The communication interface(s) 590 may be implemented in hardware or a combination of hardware and software, and may provide a wired or wireless network interface to a network, such as network 108 in FIG. 1. The user interface components 592 may include, for example, a touchscreen, a display, one or more user input components (e.g., a keyboard, a mouse, etc.), a speaker, or the like, or any combination thereof. The one or more secondary storage devices 584 may be, for example, one or more hard drives or the like, and may store data 594 (e.g., application data) and logic 596 (e.g., application management logic) to be executed by one or more application optimizer(s) 586 and/or general processor(s) 580. In an embodiment, general processor(s) 580 and/or application optimizer(s) 586 may be microprocessors, and logic 596 may be stored or loaded into memory 582 for execution by general processor(s) 580 and/or application optimizer(s) 586 to provide the functions described herein. Note that while not shown, computing system 506 may include additional components.

Figure 6:
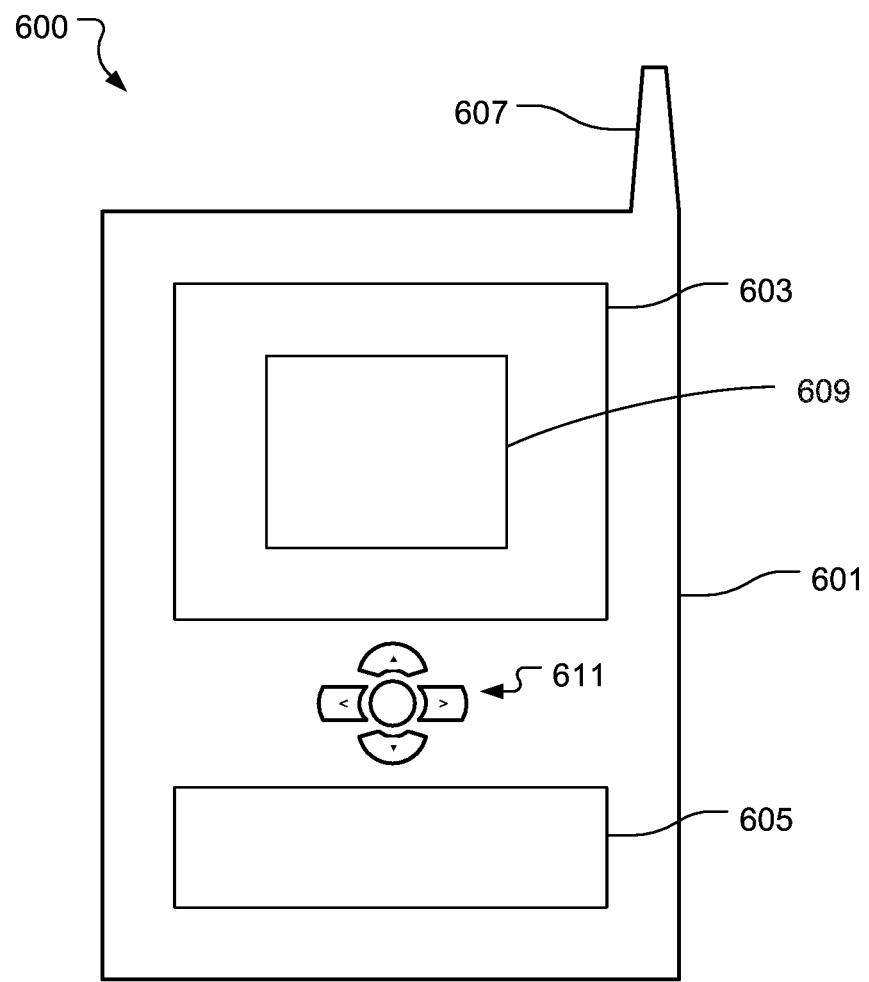
FIG. 6 illustrates an example mobile information device in which an embodiment may be implemented.

Computing system 506 may be embodied in varying physical styles or form factors. FIG. 6 illustrates embodiments of a small form factor device 600 in which system 506 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may comprise a housing 601, a display 603, an input/output (I/O) device 605, and an antenna 607. Device 600 also may comprise navigation features 611. Display 603 may comprise any suitable display unit for displaying information 609 appropriate for a mobile computing device. I/O device 605 may comprise any suitable I/O device for entering information into a mobile computing device. Examples for I/O device 605 may include an alphanumeric keyboard, a numeric keypad, a touch pad, input keys, buttons, switches, rocker switches, microphones, speakers, voice recognition devices and software, and so forth. Information also may be entered into device 600 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Technologies disclosed herein may provide cloud-based application management including application archival and retrieval that may be customized and/or optimized according to learned contextual relationships based on a user's actual application usage. Advantages include optimizing usage of disk space and memory on a user device. Another advantage includes automatic pre-loading of applications on a user device based on perceived context by the user device. A further advantage includes optimized streaming, loading, and running of retrieved applications on a user device based on learned predictions of how a user will use the application. Yet another advantage includes providing the option to download a later (newer) version of an application. Many other advantages may also be contemplated.

The particular examples and scenarios used in this document are for ease of understanding and are not to be limiting. In addition, as stated earlier, although the focus of the example embodiments used herein involve management of applications and associated files, the technologies described herein can also be applied in a similar manner to manage other types of files in addition to applications (e.g., data files, videos, images, libraries, etc.). For example, a user device may learn contextual relevancy of one or more files to a user of the device (e.g., videos of past Thanksgiving holidays may tend to be watched around the end of November). The user device may determine that one or more files are no longer contextually relevant to the user and may send a request to a server of a file management service to maintain the file as an archived file, similar to the application management service described herein (e.g., in December, the user device may determine that videos created around the end of November (in any year, for example) are no longer contextually relevant and may send a request to a file management service to archive those files). Similar to features described elsewhere herein, the user device may create a placeholder for the archived file at the user device and remove the archived file from the user device. The user device may monitor for contextual relevancy and determine that an archived file is once again contextually relevant to the user (e.g., it may be determined that it is November again). The user device may then send a request to the file management service to provide the archived file. The user device may then receive and save the requested file, and remove the placeholder. These and many other features described herein with regard to application management may be applied to the management of these other file types as well. For example, the determining, and monitoring for, contextual relevancy, and the criteria used to perform them, may be similar to what was described elsewhere herein with regard to applications.

The technologies and concepts described herein may be used to manage disk space on a user device. For example, a setting may be set that defines a threshold value such that when available disk space drops below that threshold, a review of application and/or file usage may be triggered to find applications and/or files that may not currently be contextually relevant to the user and that may be archived in order to free up disk space.

Moreover, features described herein may be used in many other contexts, as would be understood by one of ordinary skill in the art. For example, the concepts described herein do not only need to apply to applications that a user already has downloaded on his or her device. In an embodiment, a user may opt in to a service that allows contextually-relevant applications to be suggested to a user for temporary (or permanent) use. For example, when a user device is determined to be within a certain distance of Chicago, a selection of Chicago-related applications may be automatically suggested to the user. In an embodiment, the suggested applications may be tied to known user preferences (e.g., preferences geared toward art (for museum-related suggestions), preferences for certain types of food (for restaurant-related suggestions), etc.). The suggested applications may be provided in a quasi-downloaded state, and the selection of one by the user may prompt completion of the download for that application. The suggested applications may automatically be removed once they are no longer contextually relevant (e.g., once the user is determined to be more than a certain distance away from Chicago, after a pre-defined period of inactivity, etc.).

The following examples pertain to further embodiments.

APPLICATION MANAGEMENT SERVER EXAMPLES

Example 1 may include a cloud-based system for contextual application management, comprising: one or more communication devices communicatively coupled with a user device; one or more storage devices to store one or more applications no longer contextually relevant to a user of the user device; and an application repository manager, communicatively coupled with the one or more communication devices and the one or more storage devices, to: receive a request, from the user device, to maintain the one or more applications; maintain the one or more applications in the one or more storage devices; receive a request, from the user device, to provide, to the user device, a requested one of the one or more applications when the requested application becomes contextually relevant to the user; and provide the requested application to the user device.

Example 2 may include the subject matter of Example 1, wherein the maintaining of the one or more applications includes one or more of: obtaining and storing the one or more applications in the one or more storage devices or storing information regarding the one or more applications for obtaining the one or more applications when needed.

Example 3 may include the subject matter of Example 2, wherein the obtaining the one or more applications includes receiving the one or more applications from the user device.

Example 4 may include the subject matter of Example 2, wherein the obtaining the one or more applications includes obtaining a copy of the one or more applications from an external data source.

Example 5 may include the subject matter of Example 1, wherein the application repository manager is to maintain a latest version of each of the one or more applications in the one or more storage devices.

Example 6 may include the subject matter of Example 1, wherein the application repository manager is to maintain a specified version of one or more of the one or more applications if required based on user preferences of the user.

Example 7 may include the subject matter of Example 1, wherein the application repository manager is to provide the requested application to the user device by streaming bits of the requested application to the user device in an optimized order based on learned usage of the requested application.

Example 8 may include the subject matter of Example 7, wherein the learned usage is learned based on historical usage of the requested application by the user of the user device.

Example 9 may include the subject matter of Example 7, wherein the learned usage is learned based on historical usage of the requested application by a plurality of crowd-sourced users of the requested application.

Example 10 may include the subject matter of Example 1, wherein one or more of the storage devices is located on a local area network (LAN) of the user device as LAN-speed available storage.

Example 11 may include the subject matter of Example 1, wherein one or more of the storage devices is located remotely from the user device on a wide area network (WAN).

Example 12 may include the subject matter of Example 1, wherein the application repository manager is further to: receive a request, from the user device, to provide, to an other user device, a requested one of the one or more applications; and provide the requested application to the other user device.

Example 13 may include the subject matter of Example 1, wherein the application repository manager is located in one of: the user device, another user device in communication with the user device via a network, or a dedicated server in communication with the user device via a network.

Example 14 may include the subject matter of any of Examples 1-13, wherein the maintaining of the one or more applications includes determining whether there is sufficient disk space to archive at least a portion of the one or more applications in an other user device in local communication with the user device, and maintaining the at least a portion of the one or more applications at the other user device.

Example 15 may include at least one computer-readable storage medium encoded with a computer program including instructions that when executed on a processor, cause the processor to: receive a request, from a user device, to maintain one or more applications no longer contextually relevant to a user of the user device; maintain the one or more applications in one or more storage devices communicatively coupled with the processor; receive a request, from the user device, to provide, to the user device, a requested one of the one or more applications when the requested application becomes contextually relevant to the user; and provide the requested application to the user device.

Example 16 may include the subject matter of Example 15, wherein the providing the requested application to the user device includes providing the requested application to the user device by streaming bits of the requested application to the user device in an optimized order based on learned usage of the requested application.

Example 17 may include the subject matter of Example 15, wherein the computer program includes instructions to further cause the processor to: receive a request, from the user device, to provide, to an other user device, a requested one of the one or more applications; and provide the requested application to the other user device.

Example 18 may include an apparatus for contextual application management, comprising: means for communicating with a user device; means for receiving a request, from the user device, to maintain one or more applications no longer contextually relevant to a user of the user device; means for maintaining the one or more applications; means for receiving a request, from the user device, to provide, to the user device, a requested one of the one or more applications when the requested application becomes contextually relevant to the user; and means for providing the requested application to the user device.

In Example 19, Example 18 may optionally include means for receiving a request, from the user device, to provide, to an other user device, a requested one of the one or more applications; and means for providing the requested application to the other user device.

Example 20 may include a machine-implemented method of contextual application management, comprising: receiving a request at a server, from a user device, to maintain one or more applications no longer contextually relevant to a user of the user device; maintain, by the server, in one or more storage devices communicatively coupled with the server, the one or more applications; receive a request at the server, from the user device, to provide, to the user device, a requested one of the one or more applications when the requested application becomes contextually relevant to the user; and provide, by the server, the requested application to the user device.

Example 21 may include the subject matter of Example 20, wherein the providing the requested application to the user device includes providing the requested application to the user device by streaming bits of the requested application to the user device in an optimized order based on learned usage of the requested application.

In Example 22, Example 20 may optionally include receiving a request at the server, from the user device, to provide, to an other user device, an other requested one of the one or more applications; and providing, by the server, the other requested application to the other user device.

Example 23 may include at least one machine readable storage medium comprising a plurality of instructions that in response to being executed on a computing device, cause the computing device to carry out a method according to any one of Examples 20-22.

Example 24 may include an apparatus configured to perform the method of any one of the Examples 20-22.

Example 25 may include a computer system to perform the method of any one of Examples 20-22.

Example 26 may include an apparatus comprising means for performing the method of any one of Examples 20-22.

Example 27 may include a computing device comprising memory and a chipset configured to perform the method of any one of Examples 20-22.

USER DEVICE EXAMPLES

Example 1 may include a computing device for contextual application management, comprising: a memory; a user interface; a processor communicatively coupled with the memory and the user interface, the processor configured to load one or more applications into the memory, execute the one or more applications, and display displayable elements of the one or more applications on the user interface; and a communication system communicatively coupled with the processor and a network; wherein the processor is to: learn contextual relevancy of the one or more applications to a user of the computing device; determine whether an application of the one or more applications is no longer contextually relevant to the user; and if the application is determined to be no longer contextually relevant to the user, send a request via the communication system to a server of an application management service to maintain the application as an archived application; create a placeholder for the archived application at the computing device; and remove the archived application from the computing device.

Example 2 may include the subject matter of Example 1, wherein the processor is further to store the learned contextual relevancy of each application as application relevancy data.

Example 3 may include the subject matter of Example 1, wherein the learned contextual relevancy of a particular application includes one or more of a determined location of the computing device while the particular application is one or more of installed or used, when the user initially installed the particular application, what circumstances existed when the user initially installed the particular application, keywords used to find the particular application, keywords associated with the application in its description in an application market, a calendar date that the particular application is used, a time of day that the particular application is used, an event during or at which the particular application is used, other applications used before or after the particular application is used, proximity to establishments while the particular application is used, proximity to other users while the particular application is used, usage history of the particular application, on what computing device the particular application is being used, or a work status of a user while the particular application is being used.

Example 4 may include the subject matter of Example 1, wherein the determining whether the application is no longer contextually relevant to the user includes determining whether an application is no longer contextually relevant to the user based on one or more of a determined location of the computing device, calendar date, time of day, event date range, proximity to establishments, proximity to other users, usage history of the application, usage history of other applications, what computing device is being used, work status of the user, elapsed time since the application was last used, what other users with similar context have chosen for application archival, or an explicit request from the user to archive the application.

Example 5 may include the subject matter of Example 1, wherein the request to the server to maintain the application includes one or more of application preferences of the user, application usage history of the user, or archival/retrieval preferences of the user.

Example 6 may include the subject matter of Example 1, wherein the placeholder includes one or more of application metadata, application preferences of the user, configuration settings, or instructions for re-installing the archived application.

Example 7 may include the subject matter of Example 1, wherein the placeholder includes a visual representation of the archived application for presentation on a display of the user interface.

Example 8 may include the subject matter of Example 1, wherein the processor is further to: monitor for contextual indicators of relevancy of the archived application; determine that the archived application is once again contextually relevant to the user of the computing device; send a request to the server to provide the archived application to the computing device; receive the requested archived application; install the requested archived application; and remove the placeholder.

Example 9 may include the subject matter of Example 8, wherein the monitoring for contextual indicators includes monitoring for one or more of location of the computing device, usage of one or more applications on the computing device, calendar date, time of day, event date range, proximity to establishments, proximity to other users, what computing device is being used, work status of the user, or explicit requests for the application by the user.

Example 10 may include the subject matter of Example 8, wherein the placeholder includes a visual representation of the archived application presented on a display of the user interface, and wherein the determining that the archived application is once again contextually relevant to the user includes receiving an input from the user on the visual representation presented on the user interface indicating that the user would like to run the archived application.

Example 11 may include the subject matter of Example 8, wherein the request to provide the archived application includes one or more of application preferences of the user, application usage history of the user, or archival/retrieval preferences of the user.

Example 12 may include the subject matter of Example 8, wherein the receiving the requested archived application includes receiving data bits of the requested archived application in an order based on one or more of application preferences of the user, application usage history of the user, or archival/retrieval preferences of the user.

Example 13 may include the subject matter of Example 8, wherein the installing the requested archived application includes installing the requested archived application in an order based on one or more of application preferences of the user, application usage history of the user, or archival/retrieval preferences of the user.

Example 14 may include the subject matter of Example 8, wherein the processor is further to execute the installed application beginning at a point in the application based on one or more of application preferences of the user or application usage history of the user.

Example 15 may include the subject matter of Example 8, wherein, based on user preferences, the application received by the computing device from the server is one of: a copy of the application originally installed on the computing device, a different version of the application originally installed on the computing device, a latest version of the application originally installed on the computing device, or a different application to replace the application that was originally installed on the computing device.

Example 16 may include the subject matter of Example 1, wherein the processor is further to: receive a request from the user to provide the archived application to an other computing device; and send a request to the server to provide the archived application to the other computing device.

Example 17 may include the subject matter of any of Examples 1-16, wherein the server is one of: the user device, another user device in communication with the user device via the network, or a dedicated server in communication with the user device via the network.

Example 18 may include at least one computer-readable storage medium encoded with a computer program including instructions that when executed on a processor, cause the processor to: learn contextual relevancy of one or more applications installed on a computing device to a user of the computing device; determine whether an application of the one or more applications is no longer contextually relevant to the user of the computing device; and if the application is determined to be no longer contextually relevant to the user, send a request to a server of an application management service to maintain the application as an archived application; create a placeholder for the archived application at the computing device; and remove the archived application from the computing device.

Example 19 may include the subject matter of Example 18, wherein the computer program includes instructions to further cause the processor to: monitor contextual inputs for relevancy of the archived application; determine that the archived application is once again contextually relevant to the user of the computing device; send a request to the server to provide the archived application to the computing device; receive the requested archived application; install the requested archived application; and remove the placeholder.

Example 20 may include the subject matter of Example 18, wherein the computer program includes instructions to further cause the processor to: receive a request from the user to provide the archived application to an other computing device; and send a request to the server to provide the archived application to the other computing device.

Example 21 may include an apparatus for contextual application management, comprising: means for learning contextual relevancy of one or more applications installed on the apparatus to a user of the apparatus; means for determining whether an application of the one or more applications installed on the apparatus is no longer contextually relevant to the user of the apparatus; and means for, when the application is determined to be no longer contextually relevant to the user, sending a request to a server of an application management service to maintain the application as an archived application; creating a placeholder for the archived application at the apparatus; and removing the archived application from the apparatus.

In Example 22, Example 21 may optionally include means for monitoring contextual inputs for relevancy of the archived application; means for determining that the archived application is once again contextually relevant to the user of the computing device; means for sending a request to the server to provide the archived application to the computing device; means for receiving the requested archived application; means for installing the requested archived application; and means for removing the placeholder.

In Example 23, Example 21 may optionally include means for receiving a request from the user to provide the archived application to an other device; and means for sending a request to the server to provide the archived application to the other device.

Example 24 may include a machine-implemented method of contextual application management, comprising: learning, by a computing device, contextual relevancy of one or more applications installed on the computing device to a user of the computing device; determining, by the computing device, whether an application of the one or more applications is no longer contextually relevant to the user of the computing device; and if the application is determined to be no longer contextually relevant to the user, sending a request to a server of an application management service to maintain the application as an archived application; creating a placeholder for the archived application at the computing device; and removing the archived application from the computing device.

In Example 25, Example 24 may optionally include monitoring contextual inputs for relevancy of the archived application; determining that the archived application is once again contextually relevant to the user of the computing device; sending a request to the server to provide the archived application to the computing device; receiving the requested archived application; installing the requested archived application; and removing the placeholder.

In Example 26, Example 24 may optionally include receiving a request from the user via a user interface of the computing device to provide the archived application to an other computing device; and sending a request to the server to provide the archived application to the other computing device.

Example 27 may include at least one machine readable storage medium comprising a plurality of instructions that in response to being executed on a computing device, cause the computing device to carry out a method according to any one of Examples 24-26.

Example 28 may include an apparatus configured to perform the method of any one of the Examples 24-26.

Example 29 may include a computer system to perform the method of any one of Examples 24-26.

Example 30 may include an apparatus comprising means for performing the method of any one of Examples 24-26.

Example 31 may include a computing device comprising memory and a chipset configured to perform the method of any one of Examples 24-26.

Example 32 may include a computing device for contextual application management, comprising: a memory; a user interface; a processor communicatively coupled with the memory and the user interface, the processor configured to load one or more applications into the memory, execute the one or more applications, and display displayable elements of the one or more applications on the user interface; and a communication system communicatively coupled with the processor and a network; wherein the processor is to: set one or more of application preferences of a first user of the computing device, archival/retrieval preferences of the first user, or relevancy of the one or more applications as application management settings that are initially identical to those of a second user of an other computing device; determine whether an application of the one or more applications is no longer contextually relevant to the first user; and if the application is determined to be no longer contextually relevant to the first user, send a request to a server of an application management service to maintain the application as an archived application; create a placeholder for the archived application at the computing device; and remove the archived application from the computing device.

Example 33 may include the subject matter of Example 32, wherein the setting of the application management settings is accomplished via one or more of providing a user identifier for the second user, performing a near-proximity data exchange with the other computing device, providing an identification of the second user through a social media relationship, or copying one or more setting files from the computing device of the second user to the computing device of the first user.

Example 34 may include a computing device for contextual file management, comprising: a memory; a user interface; a processor communicatively coupled with the memory and the user interface, the processor configured to load one or more files into the memory for use, and display displayable elements of the one or more files on the user interface; and a communication system communicatively coupled with the processor and a network; wherein the processor is to: learn contextual relevancy of the one or more files to a user of the computing device; determine whether a file of the one or more files is no longer contextually relevant to the user; and if the file is determined to be no longer contextually relevant to the user, send a request via the communication system to a server of a file management service to maintain the file as an archived file; create a placeholder for the archived file at the computing device; and remove the archived file from the computing device.

Example 35 may include the subject matter of Example 34, wherein the processor is further to: monitor for contextual indicators of relevancy of the archived file; determine that the archived file is once again contextually relevant to the user of the computing device; send a request to the server to provide the archived file to the computing device; receive the requested archived file; save the requested archived file; and remove the placeholder.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons of ordinary skill in the relevant art that various changes in form and detail may be made therein without departing from the scope of the methods and systems disclosed herein. Thus, the breadth and scope of the claims should not be limited by any of the exemplary embodiments disclosed herein.

As used in this application and in the claims, a list of items joined by the term "one or more of" can mean any combination of the listed terms. For example, the phrases "one or more of A, B or C" and "one or more of A, B, and C" can mean A; B; C; A and B; A and C; B and C; or A, B and C.

What is claimed is:

1. A computing device for contextual application management, comprising:
   a memory;
   a user interface used to display installed and executable applications;
   a processor communicatively coupled with the memory and the user interface, the processor configured to load one or more applications into the memory, execute the one or more applications, and display displayable elements of the one or more applications on the user interface; and
   a communication system communicatively coupled with the processor and a network;
   wherein the processor is to operate an application management application to manage an application management service of a server external to the computing device to:
      send a request via the communication system to the application management service, to maintain a no longer contextually relevant application to a user of the computing device as an archived application;
      create a placeholder for the archived application at the user interface of the computing device, wherein the placeholder is visible to the user, the placeholder has associated version information and application-specific user preferences stored in the computing device and related to the application archived on the server external to the computing device, and the server is to provide a different application; and
      remove the archived application from the computing device.

2. The computing device of claim 1, wherein the processor is further arranged to:
   learn contextual relevancy of the one or more applications to the user of the computing device; and
   store the learned contextual relevancy of each application as application relevancy data.

3. The computing device of claim 1, wherein the processor is further arranged to learn contextual relevancy of the one or more applications to the user of the computing device, wherein the learned contextual relevancy of a particular application includes one or more of a determined location of the computing device while the particular application is one or more of installed or used, when the user initially installed the particular application, what circumstances existed when the user initially installed the particular application, keywords used to find the particular application, keywords associated with the application in its description in an application market, a calendar date that the particular application is used, a time of day that the particular application is used, an event during or at which the particular application is used, other applications used before or after the particular application is used, proximity to establishments while the particular application is used, proximity to other users while the particular application is used, usage history of the particular application, on what computing device the particular application is being used, or a work status of a user while the particular application is being used.

4. The computing device of claim 1, wherein the processor is further arranged to:
   learn contextual relevancy of the one or more applications to the user of the computing device, and
   determine whether an application of the one or more applications is no longer contextually relevant to the user, wherein the determining whether the application is no longer contextually relevant to the user includes determining whether an application is no longer contextually relevant to the user based on one or more of a determined location of the computing device, calendar date, time of day, event date range, proximity to establishments, proximity to other users, usage history of the application, usage history of other applications, what computing device is being used, work status of the user, elapsed time since the application was last used, what other users with similar context have chosen for application archival, or an explicit request from the user to archive the application.

5. The computing device of claim 1, wherein the request to the server to maintain the application includes one or more of application preferences of the user, application usage history of the user, or archival/retrieval preferences of the user.

6. The computing device of claim 1, wherein the placeholder includes one or more of application metadata, application preferences of the user, configuration settings, or instructions for re-installing the archived application.

7. The computing device of claim 1, wherein the placeholder includes graying of an icon used to identify the application to the user when the application is contextually relevant.

8. The computing device of claim 1, wherein the processor is further arranged to:
monitor for contextual indicators of relevancy of the archived application;
determine that the archived application is once again contextually relevant to the user of the computing device;
send the request to the server to provide the archived application to the computing device;
receive the provided different application;
install the provided different application; and
replace the placeholder by an icon used to identify the archived application to the user when the archived application is contextually relevant.

9. The computing device of claim 8, wherein the monitoring for contextual indicators includes monitoring for one or more of location of the computing device, usage of one or more applications on the computing device, calendar date, time of day, event date range, proximity to establishments, proximity to other users, what computing device is being used, work status of the user, or explicit requests for the application by the user.

10. The computing device of claim 8, wherein the determining that the archived application is once again contextually relevant to the user includes receiving an input from the user on the placeholder for the archived application at the user interface indicating that the user would like to run the archived application.

11. The computing device of claim 8, wherein the request to provide the archived application includes one or more of application preferences of the user, application usage history of the user, or archival/retrieval preferences of the user.

12. The computing device of claim 8, wherein the receiving the provided different application includes receiving data bits of the provided different application in an order based on one or more of application preferences of the user, application usage history of the user, or archival/retrieval preferences of the user.

13. The computing device of claim 8, wherein the installing the provided different application includes installing the provided different application in an order based on one or more of application preferences of the user, application usage history of the user, or archival/retrieval preferences of the user.

14. The computing device of claim 8, wherein the processor is further to execute the installed different application beginning at a point in the different application based on one or more of application preferences of the user or application usage history of the user.

15. The computing device of claim 1, wherein the processor is further to:
receive a request from the user to provide the archived application to another computing device; and
send a request to the server to provide the archived application to the other computing device.

16. The computing device of claim 1, wherein the server is one of: a user device, another user device in communication with the user device via the network, or a dedicated server in communication with the user device via the network.

17. The computing device of claim 1, wherein the processor is to operate the application management application to:
learn contextual relevancy of the application to the user of the computing device; and
determine the application is no longer contextually relevant to the user.

18. At least one non-transitory computer-readable storage medium encoded with a computer program including instructions that when executed on a processor of a computing device to cause the computing device to:
send a request to a server of an application management service, the server being external to the computing device, to maintain a no longer contextually relevant application to a user of the computing device as an archived application;
create a placeholder for the archived application at an interface of the computing device, wherein the interface is used to display installed and executable applications, the placeholder is visible to the user, the placeholder has associated version information and application-specific user preferences stored in the computing device and related to the application archived on the server external to the computing device, and the server is to provide a different application based on preferences or instructions included in a request to the server for the application; and
remove the archived application from the computing device.

19. The at least one non-transitory computer-readable storage medium of claim 18, wherein the computer program includes instructions to further cause the processor to:
monitor contextual inputs for relevancy of the archived application;
determine that the archived application is once again contextually relevant to the user of the computing device;
send the request to the server to provide the archived application to the computing device;
receive the provided different application;
install the provided different application; and
replace the placeholder by an icon used to identify the archived application to the user when the archived application is contextually relevant.

20. The at least one non-transitory computer-readable storage medium of claim 18, wherein the computer program includes instructions to operate the application management application to cause the computing device to:
- learn contextual relevancy of the application to the user of the computing device; and
- determine the application is no longer contextually relevant to the user.

21. A machine-implemented method of contextual application management, comprising:
- sending, by a computing device, a request to a server of an application management service, the server being external to the computing device, to maintain a no longer contextually relevant application to a user of a computing device as an archived application;
- creating a placeholder for the archived application at an interface of the computing device, wherein the interface is used to display installed and executable applications, the placeholder is visible to the user, the place holder has associated version information and application-specific user preferences stored in the computing device and related to the application archived on the server external to the computing device, and the server is to provide a different application based on preferences or instructions included in a request to the server for the application; and
- removing the archived application from the computing device.

22. The method of claim 21, further comprising:
- monitoring contextual inputs for relevancy of the archived application;
- determining that the archived application is once again contextually relevant to the user of the computing device;
- sending the request to the server to provide the archived application to the computing device;
- receiving the provided different application;
- installing the provided different application; and
- replacing the placeholder by an icon used to identify the archived application to the user when the archived application is contextually relevant.

23. The method of claim 21, further comprising:
- receiving a request from the user via a user interface of the computing device to provide the archived application to another computing device; and
- sending a request to the server to provide the archived application to the other computing device.

24. The method of claim 21, further comprising:
- learning contextual relevancy of the application to the user of the computing device; and
- determining the application is no longer contextually relevant to the user.

* * * * *